Figure 1:
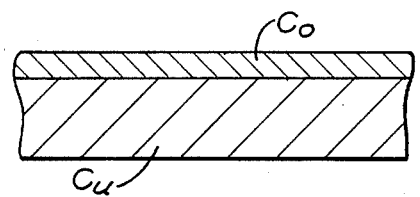

United States Patent [19]

Listemann et al.

[11] Patent Number: 4,518,662

[45] Date of Patent: May 21, 1985

[54] COPPER SOLDER CONTAINING COBALT

[75] Inventors: Peter Listemann; Sigurd Mönch, both of Mauren, Liechtenstein

[73] Assignee: Hilti Aktiengesellschaft, Fürstentum, Liechtenstein

[21] Appl. No.: 617,794

[22] Filed: Jun. 6, 1984

[30] Foreign Application Priority Data

Jun. 14, 1983 [DE] Fed. Rep. of Germany ....... 3321437

[51] Int. Cl.³ ................................................. C22C 9/06
[52] U.S. Cl. ...................................... 428/675; 148/24; 228/56.3; 228/263.18; 420/496
[58] Field of Search ................ 420/496, 477; 428/675, 428/627; 228/263.12, 263.15, 263.18; 148/411, 432, 24

[56] References Cited

U.S. PATENT DOCUMENTS

| 3,128,177 | 4/1964 | Rennhack | 420/496 |
| 4,133,473 | 1/1979 | Tabelev et al. | 228/263.15 |

FOREIGN PATENT DOCUMENTS

| 1550563 | 12/1968 | France | 228/263.18 |
| 6614 | 3/1965 | Japan | 420/496 |
| 137447 | 8/1982 | Japan | 420/496 |
| 318446 | 10/1971 | U.S.S.R. | 228/263.12 |

*Primary Examiner*—Peter K. Skiff
*Attorney, Agent, or Firm*—Toren, McGeady, Stanger

[57] ABSTRACT

Copper alloy solders are disclosed which contain 0.5 to 20% by weight of cobalt. The copper and cobalt may be arranged in heterogeneous phases.

22 Claims, 3 Drawing Figures

COPPER SOLDER CONTAINING COBALT

FIELD OF THE INVENTION

The invention generally relates to solders and soldering and is particularly directed to copper alloy solders and the use of such solders, particularly for soldering steel with hard metals. The inventive copper alloy solders exhibit the characteristics of reactive solder. Considered from another aspect, the invention is directed to non-ferrous copper alloys which are suitable for use as solders.

The invention is also directed to copper and cobalt containing solders, wherein the copper and/or the cobalt are at least partly provided in a heterogeneous phase.

BACKGROUND INFORMATION

Copper solders and copper alloy solders are hard solders which have been used for soldering purposes in the past. In addition to using solders which exclusively or essentially exclusively consist of copper, copper alloy solders have found acceptance in the industry which contain between about 40 to 60% by weight of copper, small amounts of silicon, for example, 0.2% by weight of silicon, with the remainder being zinc. In some instances, nickel is also contained in such prior art copper alloy solders.

For the purpose of preparing such solders, the metal or the alloy are melted and the molten material is cast in molds, whereafter, by means of customary forming measures, such as drawing, pressing, or rolling, the material is formed into wires, profiles or sheets. It is also possible to produce powders by means of grinding. Customary fluxing agents can also be added or incorporated by melting.

Copper and copper alloy solders, in dependence on their use, exhibit the capability to react with the steel, cast iron, hard metal and the like to be soldered under the formation of solid solutions and/or stoichiometrically defined compounds. Such solders are then usually designated as reaction solders. In the hard soldering of steel, cast iron and hard metals in general, such solders are used to a large extent and for economical and technical reasons in the manufacture of machine parts, apparatus, devices, tools and electromotors and the like. In using such reactive solders, it is common, particularly in the soldering of steel and hard metal, such as tungsten carbide-cobalt-alloys, wherein the cobalt binder may be partially replaced by other metals as, for example, nickel, to perform the soldering procedure at relatively high temperatures, for example, above 1100° C. either in vacuum or under a protective gas atmosphere. The term "hard metals" as used herein is deemed to refer particularly to tungsten carbide-cobalt-alloys which, in most instances, contain small, weighed out contents of carbon and wherein the binder metal cobalt may be replaced by other metals as, for example, nickel. However, the term also refers to titanium and tantalum carbides which, in like manner, usually contain cobalt and the other metals as binding agents.

Experience has shown that in using such prior art solders, for example, for the soldering of steel with hard metal, the desired results are not fully achieved. It has thus been ascertained that, for example, dissolution phenomena occur along the grain boundary of the steel resulting in corresponding lowering of the static and, primarily, the dynamic strength. In particular, the toughness of the steel in this region is markedly reduced. In hard metal, by contrast, a brittleness of the marginal zone by diffusion, formation of intermetallic phases and the so-called Kirkendall effect under formation of a brittle zone have been observed. Moreover, in some instances, the formation of an $\eta$-like layer, primarily in the soldering of steel with the hard metal has been observed as a consequence of a certain carbon deprivation on the hard metal side of the soldered structure. Primarily, in subjecting the soldered system to impact, these negative diffusion related phenomena have resulted in impermissibly poor results.

OBJECTS OF THE INVENTION

It is a primary object of the invention to provide copper containing solders which eliminate the drawbacks and disadvantages of the prior art copper based solder materials and to provide a solder material which is superiorly effective in the soldering of steel and hard metal.

Generally, it is an object of the invention to improve on the art of soldering as hitherto practiced.

DESCRIPTION OF THE INVENTION

In accordance with the invention, it has surprisingly been ascertained that the disadvantages of the prior art solder materials are eliminated by effecting the soldering with a copper alloy solder which contains 0.5 to 20% by weight of cobalt. In addition to the copper, which thus constitutes the major portion of the solder, and the indicated amount of cobalt, the solder material may also comprise common alloy components as, for example, silicon and carbon, particularly in an amount of up to 0.8% by weight. Further, other usual solder components, such as fluxing agents and binders, which are volatile at the soldering temperature may be contained in the solder. Particularly if the solder is in powder form or in the form of molded powder structures, organic compounds which give off carbon under the soldering conditions may be contained in the solder material, either instead of or in addition to the carbon moiety otherwise contained in the solder. It is also feasible to add to the solder stability improving substances, metals, non-metals and organic substances, in general.

Experiments have demonstrated that particularly advantageous results are obtained with a copper alloy solder containing 88 to 97% by weight of copper, 1 to 12% by weight of cobalt and 0–0.6% by weight of carbon. A carbon content of 0.05 to 0.5% by weight is preferred. Any remainder may be constituted of the common solder components as indicated above.

For some applications, a copper alloy solder is preferred which contains at least 91% by weight of copper, 2–8% by weight of cobalt and up to 0.4% by weight of carbon. In a particularly preferred embodiment, the inventive copper alloy solder comprises 94 to 97% by weight of copper, 3 to 6% by weight of cobalt and up to 0.6% by weight of carbon. Generally, it is particularly advantageous if the cobalt content is chosen such that it is between 1% by weight and the amount by weight of cobalt which is maximally soluble at the soldering temperature.

The carbon which may be contained in the copper alloy solder of the invention may be present as a constituent of the mixture. However, if the solder is powder shaped, carbon may be wholly or partly present in the form of a saturated CoC alloy or in the form of an organic substance which, during the soldering, forms a corresponding amount of carbon. Such compounds are well known, see Römpps Chemie Lexikon, 7th Edition, p. 1811.

The invention also encompasses reactive solder on copper basis containing 0.5 to 20% by weight of cobalt wherein the copper and/or cobalt are present at least partly in heterogeneous phases. In a preferred embodiment, the copper and the cobalt are completely present in heterogeneous phases. In addition to the copper which constitutes a major portion of the solder and the indicated amount of cobalt, the solder material, as in the previously described homogeneous phase embodiment, may contain additional, common alloy components, such as silicon, for example, in amounts of 0.1 to 0.4% by weight and/or carbon. A particularly preferred carbon content is up to 0.8% by weight, that is, 0 to 0.8% by weight.

As stated in connection with the previous embodiment, wherein the copper and the cobalt are in homogeneous phase, solder, wherein the copper and the cobalt are in heterogeneous phases, may, in like manner, contain additional components, such as fluxing agents, binders which are volatile at the soldering temperature and the like. The disclosure given in respect to the first, homogeneous embodiment is as applicable to the heterogeneous embodiment, even if the copper and cobalt are present in two separate layers. The preferred percentage values as stated in the first embodiment are equally applicable to the heterogeneous embodiment.

In addition to soldering steel and cast iron, the inventive copper alloy solders have been shown to be exceedingly suitable for the soldering of steel with hard metals, particularly tungsten carbide-cobalt-hard metals which ordinarily contain WC, Co and C in weighed out amounts. Also, the use of the solders for the soldering of steel with hard metals on titanium or tantalum-carbide basis which contain cobalt or other metals, such as, for example, nickel, as binding agents, is feasible within the scope of this invention.

Concerning the embodiment wherein the copper and cobalt of the reaction solder are present in heterogeneous phase, the components of the solder should preferably be present, at least partially, in finely particulate form. In a preferred embodiment, the components are in powder form. The solder may thus be in the form of powder mixtures, for example, molded bodies which have been manufactured in a powder metallurgical manner. These bodies may contain the additional components referred to, with or without carrier material. However, it should be appreciated that the heterogeneous reaction solders may also be incorporated in solid or paste-like carriers wherein the carriers preferably are inert. However, it is also feasible to incorporate the solders in reactive carrier materials as, for example, carbon compound carriers which form carbon at the soldering temperature. Metal carriers can also be used.

It has been ascertained that particularly superior results are obtained with a heterogeneous solder material which contains multiple layers as, for example, a reactive solder which is in sandwich or laminated form wherein the different layers have different compositions. This is effected in such a manner that the copper and the cobalt, at least partially, are arranged in different layers. It is thus feasible to provide layers which contain only copper or cobalt in addition to the other ingredients referred to; in the alternative, it is feasible to provide layers which have different copper/cobalt concentrations. Heterogeneous reaction solders are preferred which have layers which essentially or dominantly consist of copper or cobalt, respectively, particularly if such a copper layer is arranged in sandwich formation between two cobalt layers. The customary auxiliary soldering agents, binders, carbon forming agents and the like may be arranged, for example, between the layers.

If the heterogeneous solder material is used for the soldering of steel with hard metals on titanium or tantalum carbide basis which contain cobalt or other metals, such as, for example, nickel, as binder, it is particularly preferred to arrange the cobalt layer on the steel side. In this manner, a seal-like effect occurs while largely preventing iron diffusion.

The invention, considered from another aspect, is directed to non-ferrous alloys containing at least 91% by weight of copper, 3 to 8% by weight of cobalt and 0.05 to 0.5% by weight of carbon. The preferred non-ferrous alloys are those containing 92 to 96% by weight of copper, 4 to 8% by weight of cobalt and 0.05 to 0.6% by weight of carbon. The carbon content of 0.05 to 0.5% by weight is preferred.

As will have become apparent from the above, the inventive alloys may advantageously be used as reactive solders, particularly for the soldering of steel with hard metals, such as those on tungsten-carbide-cobalt basis.

The invention will now be described by several examples, it being understood that these examples are given by way of illustration and not by way of limitation.

EXAMPLE 1 (HOMOGENOUS SOLDER)

The following tests were carried out with tools for stone working machines. The drill bit of the tool had, at its point, hard metal tips which were soldered to the steel tool proper. The purpose of the test was to establish the strength of the soldering connection between the steel tool and the tips. Ten drill bits soldered with prior art copper solder and ten drill bits soldered with the inventive homogenous copper-cobalt alloy were used for drilling into the stone material.

The following results were obtained:

| Prior Art Cu—Solder: | 4 × 1 bore<br>3 × 5 bores<br>1 × 50 bores<br>2 × >100 bores | } breakage |
|---|---|---|
| Cu + 6% Co—Solder: | 1 × 4 bores<br>1 × 5 bores<br>1 × 21 bores<br>1 × 28 bores<br>6 × >100 bores | } breakage |

As will be seen from the above, four drill bits, pursuant to the prior art copper solder, broke after a single drilling operation, while three drill bits broke after five drilling operations. One drill bit was no longer usable after 50 drilling operations, while two of the bits withstood more than 100 drilling operations.

By contrast, six of the drill bits soldered in accordance with the inventive solder withstood more than 100 drilling operations.

EXAMPLE 2

This example is directed to an inventive reactive solder, wherein the copper and the cobalt are arranged in heterogeneous phases. A cobalt layer of 8μ was superimposed on a copper foil of 0.1 mm thickness. The cobalt layer had been applied to the copper foil galvanically. The solder material thus obtained was used for the soldering of steel with hard metal. The cobalt layer, during the soldering, faced the steel. A substantial increase of the impact strength of the soldered system was obtained.

EXAMPLE 3

On each face of a copper sheet or foil of 0.15 mm was applied galvanically a cobalt layer of 5μ. The solder material thus obtained was used in the soldering of steel with hard metal. Substantially increased strength characteristics of the soldered system were observed.

Figure 2:
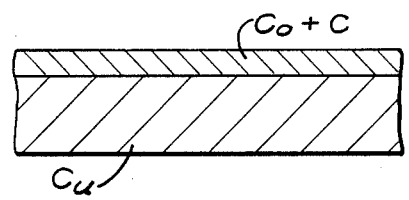
Figure 3:
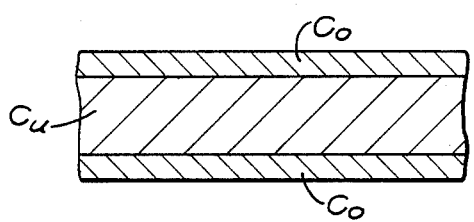

The heterogeneous embodiment of the invention is shown in the accompanying drawings, wherein FIGS. 1, 2 and 3 show three separate constructions.

In FIG. 1, the solder comprises juxtaposed copper and cobalt layers; while in FIG. 2, the cobalt layer also contains carbon. In FIG. 3, the copper layer is sandwiched between two cobalt layers.

What is claimed is:

1. In a copper alloy solder, the improvement which comprises that the solder contains 0.5 to 20% by weight of cobalt 0.05 to 0.5% by weight of carbon, balance copper.

2. The improvement of claim 1, wherein the solder comprises:
   88–97% by weight of copper,
   1–12% by weight of cobalt, and
   0.05–0.5% by weight of carbon.

3. The improvement of claim 1, wherein the solder comprises:
   at least 91% by weight of copper,
   2–8% by weight of cobalt, and
   0.05–0.4% by weight of carbon.

4. The improvement of claim 1, wherein the solder comprises:
   94–97% by weight of copper,
   3–6% by weight of cobalt, and
   0.05–0.5% by weight of carbon.

5. The improvement of claim 1, wherein the solder comprises carbon in an amount up to the saturation limit of the cobalt.

6. The improvement of claim 1, wherein the solder contains carbon in an amount corresponding to the saturation limit of the cobalt.

7. In a reactive copper alloy solder, the improvement which comprises that the solder contains 0.5 to 20% by weight of cobalt with the copper and the cobalt, 0.05–0.5% by weight of carbon, balance copper at least partially being arranged in heterogeneous phases.

8. The improvement of claim 7, wherein the solder comprises:
   88–97% by weight of copper,
   1–12% by weight of cobalt, and
   0.05–0.5% by weight of carbon.

9. The improvement of claim 7, wherein the solder comprises:
   at least 91% by weight of copper,
   2–8% by weight of cobalt, and
   0.05–0.4% by weight of carbon.

10. The improvement of claim 7, wherein the solder comprises:
    94–97% by weight of copper,
    3–6% by weight of cobalt, and
    0.05–0.5% by weight of carbon.

11. The improvement of claim 7, wherein the solder comprises carbon in an amount up to the saturation limit of cobalt.

12. The improvement of claim 7, wherein carbon is present in the form of a cobalt-carbon alloy in an amount up to the saturation limit of the cobalt.

13. The improvement of claim 7, wherein carbon is present in the form of a carbon compound which gives off carbon at the soldering temperature.

14. The improvement of claim 7, wherein at least one of the copper and cobalt are present in finely particulate form.

15. The improvement of claim 7, wherein the solder is incorporated in a solid or paste-like inert carrier.

16. A composite solder composition comprising at least one layer of copper and at least one layer of cobalt, wherein the composite contains 0.5–20% by weight of cobalt, 0.05–0.5% by weight of carbon, balance copper.

17. The improvement of claim 16, further comprising a carbon containing layer.

18. The improvement of claim 16, wherein the copper is arranged in a layer sandwiched between two cobalt layers.

19. A non-ferrous alloy comprising:
    at least 91% by weight of copper,
    3–8% by weight of cobalt,
    0.05–0.5% by weight of carbon,
    with the remainder being contaminants.

20. A non-ferrous alloy comprising:
    92–96% by weight of copper,
    4–8% by weight of cobalt, and
    0.05–0.6% by weight of carbon.

21. A method of soldering steel with hard metal, such as WC-Co-hard metal, which comprises effecting the soldering with a copper alloy solder containing 0.5–20% by weight of cobalt, 0.05–0.5% by weight of carbon, balance copper.

22. A method of soldering steel with hard metal which comprises effecting the soldering with a reactive solder containing a copper layer and at least one separate cobalt layer wherein the solder contains 0.05–20% by weight of cobalt, 0.05–0.5% by weight of carbon balance copper.

* * * * *